Feb. 21, 1967 J. C. BRICE ETAL 3,305,819
SUPERCONDUCTOR DEVICES
Filed Sept. 8, 1965 3 Sheets-Sheet 1

INVENTORS
JOHN C. BRICE
DAVID R. TILLEY
GERARDUS J. VAN GURP
CORNELIS W. BERGHOUT
BY Frank R. [signature]
AGENT Feb. 21, 1967 J. C. BRICE ETAL 3,305,819

SUPERCONDUCTOR DEVICES

Filed Sept. 8, 1965 3 Sheets-Sheet 2

INVENTORS
JOHN C. BRICE
DAVID R. TILLEY
GERARDUS J. VAN GURP
CORNELIS W. BERGHOUT

BY Frank R. Jeffain
AGENT

INVENTORS
JOHN C. BRICE
DAVID R. TILLEY
GERARDUS J. VAN GURP
CORNELIS W. BERGHOUT
BY Frank R. Trifari
AGENT

United States Patent Office 3,305,819

Patented Feb. 21, 1967

3,305,819

SUPERCONDUCTOR DEVICES

John Chadwick Brice, Copthorne, and David Reginald Tilley, Tilgate, England, and Gerardus Josephus Van Gurp and Cornelis Willem Berghout, Geldrop, Netherlands, assignors to North American Philips Company, Inc., New York, N.Y.

Filed Sept. 8, 1965, Ser. No. 485,679
Claims priority, application Great Britain, Sept. 9, 1964, 36,907/64
19 Claims. (Cl. 338—32)

Figure 1A:
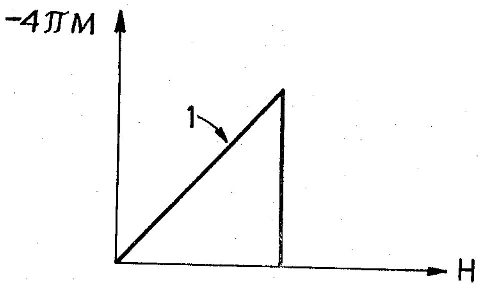

This invention relates to superconductor devices. More particularly, the invention relates to superconductor devices in which the resistance of a single crystal of superconductive material can be varied as a function of the direction of application of a magnetic field relative to the crystal axes.

There are basically two types of superconductor. The Type 1 superconductor such as substantially pure lead, tin, mercury etc. which have a magnetization/applied magnetic field characteristic as shown in curve 1 of FIGURE 1*a* and a resistance/applied magnetic field characteristic as shown in curve 2 of FIGURE 1*b* of the drawing. The transition point between the superconductive and normally conductive states for Type 1 superconductors is an abrupt transition and as such Type 1 superconductors are unsuitable for the present invention.

FIGURE 2 of the accompanying drawing shows similar characteristics for a single crystal of a Type 2 superconductor. Curve 3 shows in an idealised form, the magnetization/applied magnetic field characteristic and curve 4 shows the resistance/applied magnetic field characteristic. Referring now to curve 3, as the applied magnetic field is increased beyond the lower critical magnetic field $H_{c1}$ the curve changes direction sharply and the magnitude of the magnetization decreases. For the bulk of the superconductor the region below $H_{c1}$ is called tthe pure superconducting state. The region above $H_{c1}$ and below $H_{c2}$ is called the mixed superconducting state, and the region above $H_{c2}$ is called the normal state. The decrease in magnetization is gradual with increasing applied field and the magnetization becomes zero at the upper critical magnetic field $H_{c2}$. From curve 4 it can be seen that for an increasing magnetic field, which is applied from the transition point, the resistance of the crystal with constant measuring current increases from zero resistance at the lower critical magnetic field $H_{c1}$ to a substantially constant resistance at the upper critical magnetic field $H_{c2}$.

It has been found that Type 2 superconductors, such as niobium, are anisotropic, that is to say, the magnetic field to change the material from the superconductive state to the normal resistive state is a function of the angles made by the field with the crystal axes.

From a theoretical consideration, pure niobium has a cubic crystal lattice structure and as such it would be unsuitable for the present invention. However, as impurities such as oxygen, in the single crystal of niobium may upset the cubic lattice structure, a hysteresis effect could thereby be introduced into the materials characteristics. In choosing a superconductor material suitable for the present invention, consideration should be given to the type of crystal lattice structure. The superconductor should be a Type 2 material having a non-cubic lattice structure. Preferably the non-cubic form of lattice is inherent in the material but it will be appreciated that the non-cubic lattice can be due to impurities in the crystal lattice, or to the mode of preparation.

The invention is not limited to niobium-oxygen alloys. Other examples of Type 2 superconductor materials are vanadium alloys and certain compounds of graphite with alkali metals, such as potassium.

A device utilising the phenomena of anisotropy of the magnetic field could be used as a switch, an amplifier or a measuring instrument for measuring angular displacements or rates of rotation. The device would be maintained at a temperature below the "critical temperature" of the material, that is to say, below the temperature at which the material becomes superconducting in the absence of current in the material and external magnetic field.

According to the present invention there is provided a device comprising a single crystal of a Type 2 superconductor material having a noncubic crystal lattice structure. The device has an input and an output conductor and is arranged to be subjected to a temperature below the critical temperature of the superconductor material and to be subjected to a magnetic field greater than its lower critical magnetic field. The orientation of the field relative to the crystal is arranged to be varied so as to vary the resistance of the crystal between the input and output conductor from a first value of resistance to a second value of resistance.

Preferably the magnetic field is produced by a constant current flowing in a superconducting coil. The first value of resistance may be zero, that is to say the superconductor may be in the superconductive state.

Figure 1B:
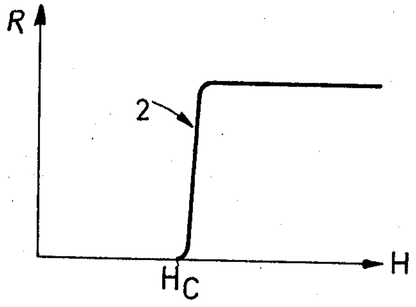
Figure 2A:
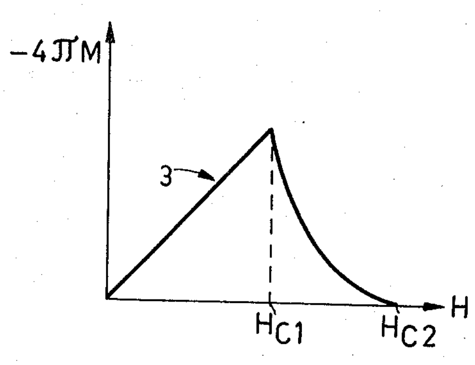
Figure 2B:
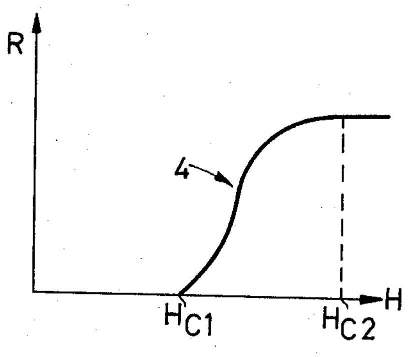
Figure 3:
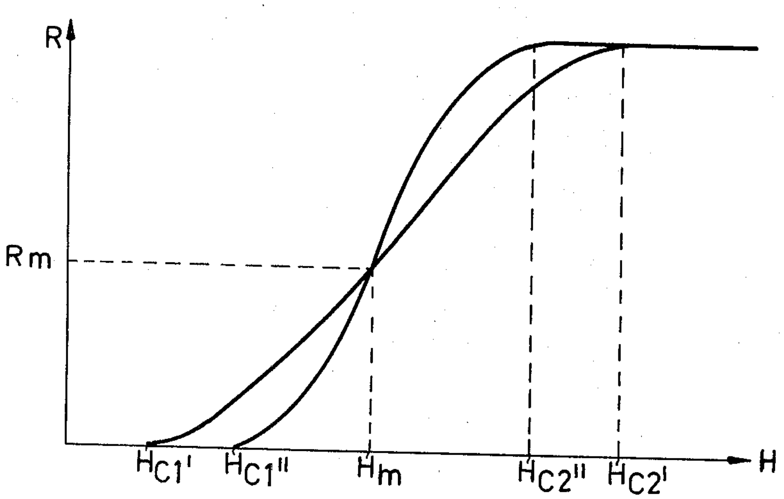
Figure 4:
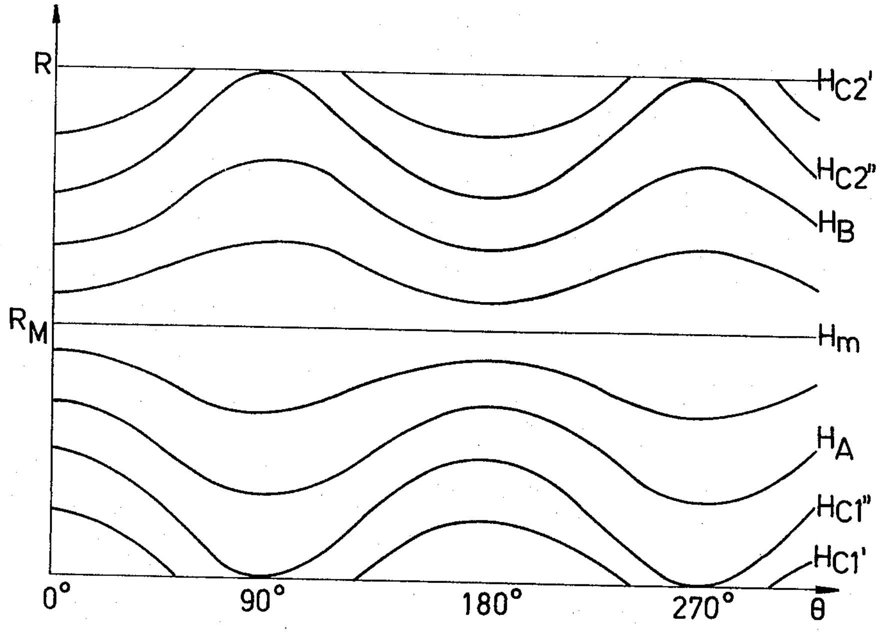
Figure 5:
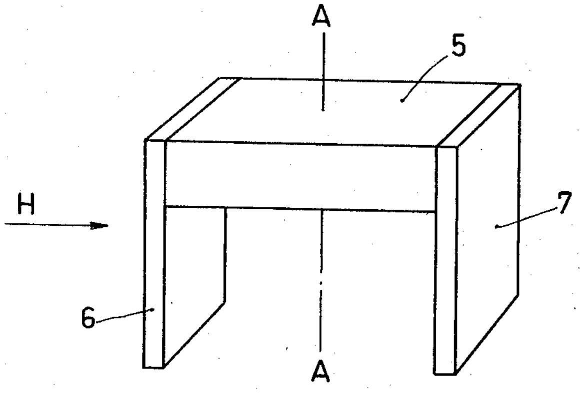
Figure 6:
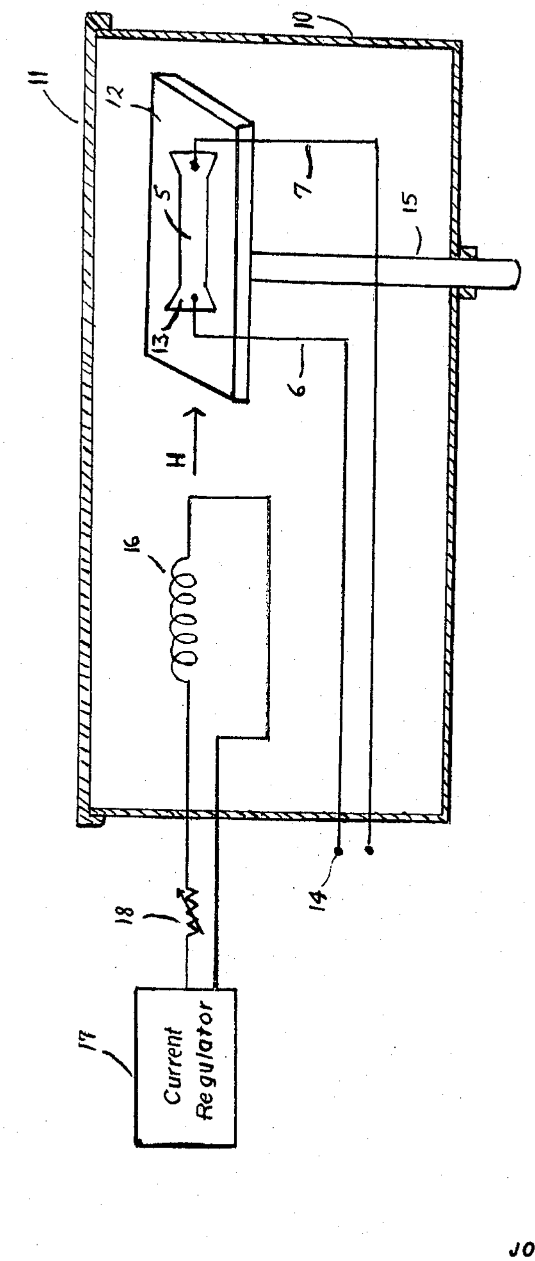

The invention will now be described by way of example with reference to the accompanying drawing in which:

FIGURES 1*a* and 1*b* of the drawing illustrate the magnetization and resistance vs. applied magnetic field characteristics, respectively, for a Type 1 superconductor material;

FIGURES 2*a* and 2*b* of the drawing illustrate the magnetization and resistance vs. applied magnetic field characteristics, respectively, for a Type 2 superconductor material;

FIGURE 3 of the drawing shows the variation of resistance with applied magnetic field for two orientations of applied field relative to the crystal axes of a Type 2 superconductor;

FIGURE 4 of the drawing shows the idealised variation of resistance with varying orientation of the crystal axes relative to the applied magnetic field;

FIGURE 5 of the drawing shows diagrammatically an embodiment of the invention; and FIGURE 6 of the accompanying drawing shows diagrammatically an arrangement which may be used as a switch, an amplifier, an angular measuring instrument or a revolution counter.

Referring now to the drawing, FIGURE 5 shows a single crystal 5 of niobium electrically connecting an input conductor 6 to an output conductor 7. The magnetic field H is arranged to be applied in the plane of the crystal 5 and the device is constructed so that there can be angular movement of the crystal 5 relative to the applied magnetic field H.

As can be seen from FIGURE 3 of the drawing, if the magnetic field is applied at an angle $\theta_1$, to the crystal axes, the resistance of the crystal will gradually increase with increasing magnetic field from zero resistance at the lower critical magnetic field $H_{C1'}$, to a substantially constant resistance at the upper critical magnetic field $H_{C2'}$. However, if the magnetic field H is applied at another angle $\theta_2$ to the crystal, then the resistance of the crystal 5 will vary from zero to the substantially constant value by following the path between the lower critical magnetic field $H_{C1''}$ to the upper critical magnetic field $H_{C2''}$. It can be seen that for predetermined angles $\theta_1$ and $\theta_2$ the curves intersect at an applied magnetic field $H_m$, when the resistances are equal.

The effect of rotating the magnetic field about the crystal axis A—A in FIG. 5 is shown for a number of values of applied magnetic field H in FIGURE 4 of the drawing.

It will be appreciated that the field may be rotated about the crystal, or the crystal may be rotated in a fixed field, or both crystal and field may be rotated about the axis A—A. The field may be produced by a so-called superconducting magnet consisting of a coil of superconductive material in which a constant current is caused to flow.

Referring now to FIGURE 6, there is shown a Dewar vessel or other suitable container 10 containing liquid helium (not shown) for providing the required superconductive temperature. A cover 11 seals the container. Within the container is a substrate 12 of glass or other insulating material. A single crystal 5 of a Type 2 superconductive material having a noncubic lattice structure is secured to the substrate 12. The single crystal 5 may be in the form of a thin film and laid down on the substrate 12 by conventional vapor deposition techniques or the like. The superconductive layer 5 is adapted to be connected in an electrical circuit and therefore has terminal portions 13 to which conductors 6 and 7 are connected. Conductors 6 and 7 pass through container 10 and terminate in terminals 14, to which a suitable load circuit or utilization device can be connected. A rotatable shaft 15 is attached to the substrate 12 and passes out through container 10 for connection to a suitable mechanical driving mechanism (not shown). A coil 16 composed of superconductive material applies a magnetic field H in the plane of the crystal 5. Rotation of shaft 15 will alter the relative angle between the applied magnetic field H and the crystal axes provided the crystal is not rotationally symmetric about the magnetic field.

A current regulator 17 supplies a constant current to coil 16 via an adjustable resistor 18. By adjusting resistor 18, the value of the applied magnetic field H can be varied so as to operate the apparatus as a switch, an amplifier, an angular measuring instrument or a revolution counter. It will of course be obvious that the openings in container 10 through which the electrical conductors and the shaft 15 pass must be suitably sealed to maintain the low temperatures in the container.

In the first place, the device can be arranged as a switch, in which case it is preferable to operate the device so that it switches between the superconductive state, i.e. zero resistance, and a finite value of resistance. In this case the applied magnetic field would be adjusted by means of resistor 18 so as to lie between the lower critical magnetic fields $H_{C1'}$ and $H_{C1''}$ and preferably at $H_{C1''}$ to obtain the maximum variation in resistance, as can be seen from FIGURE 4.

Secondly, the device can be arranged as an amplifier, in which case the magnetic field should preferably be adjusted by means of resistor 18 to lie between $H_{C1''}$ and $H_m$ or between $H_m$ and $H_{C2''}$. The variation of resistance R as a function of the angle $\theta$ can be seen from FIGURE 4 of the drawing. When the value of applied magnetic field is at $H_A$ or $H_B$ the maximum resistance variation is obtained. It can be seen that as the applied magnetic field approaches $H_m$ the range of values of resistance decreases. If the range of angles $\theta$ lies between 120°–150° the device will function as an amplifier. If the angle $\theta$ lies between 30°–60°, the device provides an inverter for applied magnetic fields less than $H_m$.

Thirdly, the device can be used as a measuring instrument for detecting small angular displacement. In this case, a continuous variation can be detected with $\theta$ lying at or near 45° and 135° and the value of applied magnetic field lying between $H_{C1''}$ and $H_{C2''}$. However, by utilising the range of applied magnetic fields between $Hc_{1'}$ and $H_{C1''}$ or between $H_{C2''}$ and $H_{C2'}$ the change in angle from a predetermined angle can be detected by a change of state from the mixed superconductive to the zero resistance state or vice versa.

Fourthly, the device can be arranged as a revolution counter to count the rate of revolution of the applied field relative to the crystal by measuring the frequency of the voltage variations across the device with constant current. In this case the applied magnetic field can assume any value between $H_{C1'}$ and $H_{C2'}$ except $H_m$ although preferably the applied magnetic field is between $H_{C1'}$ and $H_{C1''}$ so that a pulse variation in frequency can be measured by connecting an electronic counter or other frequency measuring apparatus to terminals 14.

Since the critical current in niobium and similar Type 2 superconductors are large, in the order of $10^5$ amps cm.$^{-2}$, the device can handle large currents.

It will be appreciated also that the relative orientation of the crystal axes and applied magnetic field may be varied either electrically or mechanically.

The input conductor 6 and the output conductor 7 should be substantially unaffected by variation in magnitude of the applied magnetic field and in variation in orientation relative to the direction of applied field.

The single crystal may consist of bulky material or a thin film single crystal formed on a substrate.

The superconductor material of the single crystal should have a noncubic crystal structure and may consist of a pure material, or an impure material or alloy including a superconductor material which, in the pure form, has a cubic crystal structure which is deformed into a noncubic structure in the impure material or alloy.

Although the invention has been described by means of certain specific embodiments thereof, it will be apparent that the invention may be varied in many ways within the scope of the appended claims.

What we claim is:

1. A device comprising a single crystal consisting of a Type 2 superconductor material having a noncubic crystal lattice structure, said crystal exhibiting a lower and an upper critical magnetic field value, first and second conductors connected to said crystal, means for maintaining said crystal at a temperature below the critical temperature of the superconductor material, means for applying a magnetic field to said crystal which is greater than said lower critical magnetic field value of the crystal, means for relatively moving said crystal and field applying means so that the orientation of the magnetic field relative to the crystal axis can be varied thereby to cause the resistance of said crystal to vary between a first and a second value of resistance.

2. A device as claimed in claim 1 in which the superconductor material of the signle crystal consists of an impure material comprising a material having a normally cubic crystal structure in the pure state which by the admixture thereto of a second material is deformed to a non-cubic structure to form said impure material.

3. A device as claimed in claim 2 in which the single crystal consists of a thin film of material formed on a substrate.

4. A device as claimed in claim 1 in which said first and second conductors consist of superconductor material which is in the superconductive state at the operating temperature of the device.

5. A device as described in claim 2 wherein said magnetic field applying means comprise, a coil composed of a superconductor material and means for causing a constant current to flow in said coil.

6. A device as claimed in claim 1 in which said means for relatively moving comprises means for rotating said single crystal within said magnetic field.

7. A device as claimed in claim 1 in which said means for relatively moving comprises means adapted to oscillate said single crystal within said magnetic field.

8. A device as described in claim 1 further comprising means for adjusting the magnitude of said magnetic field.

9. A device as described in claim 2 further comprising means for adjusting the magnitude of said magnetic field.

10. A device as described in claim 6 further comprising means for adjusting the magnitude of said magnetic field.

11. A device as described in claim 1 further comprising means for adjusting the magnitude of said magnetic field to a value which is intermediate said lower and upper critical magnetic field values of the crystal.

12. A device as described in claim 1 further comprising means for adjusting the magnitude of said magnetic field to a value which biases said crystal into the superconductive state for at least one relative orientation of the crystal axis to the magnetic field and into a finite resistance state for at least one other relative orientation of the crystal axis to the magnetic field whereby said device can operate as a switch.

13. A device as described in claim 1 further comprising means for adjusting the magnitude of said magnetic field to a value which is intermediate said lower and upper critical magnetic field values of the crystal, said value being chosen such that said crystal is maintained in the mixed superconductive state throughout the entire range of movement of said moving means whereby said device can operate as an amplifier.

14. A device as described in claim 1 for measuring angular displacements, said device further comprising means for adjusting the magnitude of said magnetic field to a value which biases said crystal into the mixed superconductive state and wherein said crystal is arranged to be rotatably mounted and coupled to the apparatus whose angular displacement is to be measured.

15. A device as described in claim 1 arranged to operate as a revolution counter, said device further comprising means for adjusting the magnitude of said magnetic field to a value which biases said crystal into the mixed superconductive state and wherein said first and second conductors are arranged to be connected to frequency-measuring means and wherein said means for moving is coupled to the apparatus to be measured.

16. A device as described in claim 1 wherein the superconductor material of the single crystal is an alloy comprising a first material having a normally cubic crystal lattice structure in the pure state and a second material which deforms the crystal to a non-cubic lattice structure in the alloy.

17. A device as described in claim 16 wherein said first material is niobium and said second material is oxygen.

18. A device as described in claim 1 wherein said crystal has a generally planar configuration and wherein said field applying means is arranged to apply said magnetic field in the plane of the crystal.

19. A device as described in claim 18 wherein said means for moving is arranged to effectively rotate said magnetic field about an axis which is perpendicular to the plane of the crystal.

References Cited by the Examiner

UNITED STATES PATENTS

| | | | |
|---|---|---|---|
| 2,536,805 | 1/1951 | Hansen | 310—10 X |
| 2,924,633 | 2/1960 | Sichling et al. | 338—32 X |
| 2,979,668 | 4/1961 | Dunlap | 338—32 X |
| 3,123,725 | 3/1964 | Nieda. | |
| 3,156,850 | 11/1964 | Walters | 317—158 X |
| 3,162,805 | 12/1964 | Robertson | 338—32 X |
| 3,165,685 | 1/1965 | Manteuffel et al. | 338—32 X |
| 3,181,936 | 5/1965 | Denny et al. | 317—158 X |
| 3,187,236 | 6/1965 | Leslie | 317—158 X |
| 3,198,988 | 8/1965 | Nieda | 317—23 X |
| 3,218,693 | 11/1965 | Allen et al. | 317—158 X |

RICHARD M. WOOD, *Primary Examiner.*

W. D. BROOKS, *Assistant Examiner.*